June 11, 1946.    A. RAPPL    2,401,961
MOTOR VEHICLE
Filed July 19, 1943
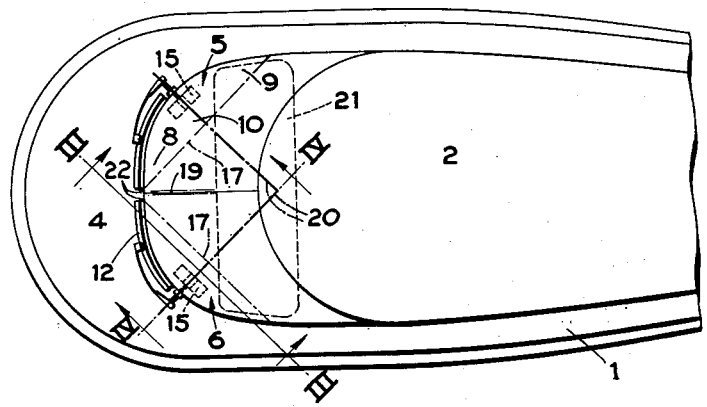
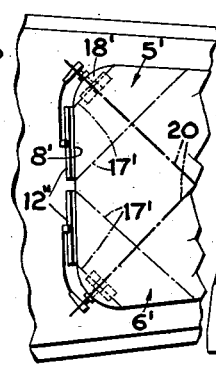
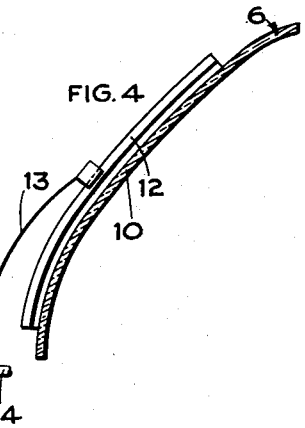
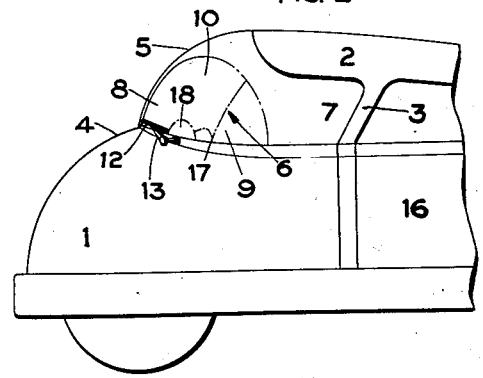
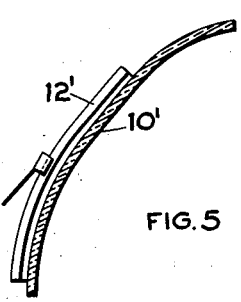
INVENTOR
ANTON RAPPL.
BY
Bean, Brooks, Buckley & Bean.
ATTORNEYS Patented June 11, 1946

2,401,961

UNITED STATES PATENT OFFICE 2,401,961

MOTOR VEHICLE

Anton Rappl, Eggertsville, N. Y., assignor to Trico Products Corporation, Buffalo, N. Y.

Application July 19, 1943, Serial No. 495,266

2 Claims. (Cl. 15—250)

This invention relates to streamlined motor cars and particularly to the windshields thereof, an object of the present invention being to provide a windshield which can readily be cleaned by an oscillating wiper in a practical manner. Further, the invention has for its object to provide a motor vehicle with a transparent front free from corner post obstruction within the field of vision, and also a vehicular construction wherein the windshield cleaner is so arranged and associated with a curved windshield as to maintain a clear field of vision both to the front as well as to the side of the path of travel.

In the drawing:

Fig. 1 is a fragmentary plan view of a motor vehicle embodying the present invention;

Fig. 2 is a side elevation thereof, in fragment;

Fig. 3 is a transverse section through the wiper path, about on line III—III of Fig. 1;

Fig. 4 is a fragmentary vertical sectional view through the windshield, about on line IV—IV of Fig. 1;

Fig. 5 is a like view showing a modification; and

Fig. 6 is an outline of a further modified shape of windshield.

Referring more particularly to the drawing, the numeral 1 designates the vehicle body having a roof 2 supported by side columns 3 to overhang at the forward end and to define with the cowl 4 a space to receive the windshield.

The windshield is of curved design and composed of right and left corner sections 5 and 6, respectively, (5' and 6' in Fig. 6), each with a side wing extension 7. Each corner section has a front portion 8 and a lateral portion 9 which forms, in effect, a side window area for lateral vision and from which the wing extends rearwardly. The front and lateral portions are joined by a top portion 10, and the three joined portions are provided with a wiper path for the wiper 12 which path is generated about the axis 11 (Fig. 3) which coincides with the axis of wiper oscillation. Consequently, the action of the wiper 12 will be uniform and the wiper carrying arm 13 will maintain the same relative position with the actuating shaft 14 of the motor 15, which latter may be of the well known suction operated type, such as is exemplified in Patent 1,978,634 granted to Henry Hueber on October 30, 1934.

Therefore, the spring pressure provided by the arm 13 for the wiping contact will be uniform and constant as the wiper traverses its arcuate path over the front, top and lateral portions. With the driver's seat being located forwardly of the door 16 and substantially between the side wings, or, in other words, well forward within the solid transparent front, which latter is devoid of vision obstructing corner posts, the vision to the front as well as to the side will be effectively maintained by the wiper. The oscillatory wiper will sweep back and forth over its path which is generated about the axis of oscillation and extends from the front transparent portion up over the top and down onto the lateral portion. The top portion admits of diagonal vision through a portion of the windshield which has heretofore been obstructed or restricted by corner posts.

The two corner sections with their side wings are preferably molded into a single unit which may readily be fitted as a single transparent front insert beneath the overhanging roof and between the latter and the cowl 4. This provides a solid front of total transparency throughout, with the corner sections each formed with an arcuate uniform wiper path extending from the front to the side of the vehicle. The transparent portions of the windshield inwardly and outwardly of the arcuate wiper path may be contoured to maintain the streamline design of the car body for proper air flow thereover, the wiper path, indicated by the broken lines 17 (Figs. 1 and 2) and 17' (Fig. 6), being primarily shaped to provide wiper contact for the full length of the wiping blade throughout its oscillating stroke. Since the wiper path delineating portion of the curved windshield is generated about the axis of wiper oscillation its cross sectional contour may be shaped to accommodate blades of different designs, as depicted at 10 in Fig. 4, at 10' in Fig. 5, and at 8' in Fig. 6. Whatever the cross sectional shape may be, the wiping edge of the blade 12 (12', 12'') will conform thereto so as to have a uniform wiping engagement with the windshield surface throughout the extent of wiper movement. The extreme corner part 18 may merge gradually into the border of the wiper path or it may be shaped in greater contrast, as shown at 18' in Fig. 6.

The two axes of wiper oscillation, indicated by the broken lines 20, extend diagonally from the corners of the solid windshield and are preferably related normal to one another, their point of intersection being substantially in a plane extending transversely of the vehicle and through the driver's seat 21. This will dispose the driver for the most efficient vision, from directly sideways to directly forward, with no intervening restriction.

The curved windshield just described provides for ample vision from the fore continuously around to the side, and this field of vision is easily cleaned by the well known and efficient oscillatory type of windshield cleaner. The divergent arrangement and disposition of the cleaner shafts at the front corners, one in each corner section of the windshield, enables a continuous sweep of each wiper from the front to the side without varying the wiping pressure or changing the angular relation of the wiper arm, which latter is pivotally articulated for swinging adjustment against the tension of a pressure spring, after the manner set forth in Patent 2,215,371 issued September 17, 1940 to Erwin C. Horton. The wiper paths at the front may be spaced more or less from each other by intervening surface areas 22 of different contour leading to a high central point, indicated by the shade lines 19, so that the front portions will recede sidewise. Since the axes of wiper path generation converge and intersect in or above the driver's seat, or substantially thereat, the driver is afforded wide and ample vision for safe driving, which field is readily cleaned by the rapidly oscillating wiper blade as it traverses its path from the front around to the side. The transverse front part 22, 8 of the windshield body is flanked by the side parts 9 which extend lengthwise of the vehicle.

While the foregoing description has been given in detail the inventive teaching may assume other physical embodiments without departing from the spirit and scope of the invention claimed.

What is claimed is:

1. A transparent front for motor vehicles having a transverse front seat, said transparent front having corner portions extending substantially over the front and side of the seat each with a regularly curved wiper path extending upwardly over a section in front of the seat and downwardly over a section to the side of the seat, an oscillatory wiper for each corner portion journaled on an axis which meets the companion wiper axis substantially in a vertical plane passing through the seat, each wiper path having an axis of generation coincident with its respective wiper axis.

2. A transparent front for motor vehicles having a transverse front seat, said transparent front having corner portions extending substantially over the front and side of the seat each with a regularly curved wiper path extending upwardly over a section in front of the seat and downwardly over a section to the side of the seat, an oscillatory wiper for each corner portion journaled on an axis which meets the companion wiper axis substantially in a vertical plane passing through the seat, each wiper path having an axis of generation coincident with its respective wiper axis, the two wiper paths being separated at the front by an intermediate transparent section of irregular contour with respect to both axes of generation.

ANTON RAPPL.